J. G. B. PROUDFOOT.
LOCOMOTIVE JOURNAL LUBRICATOR.
APPLICATION FILED JAN. 26, 1921.
1,400,237.
Patented Dec. 13, 1921.
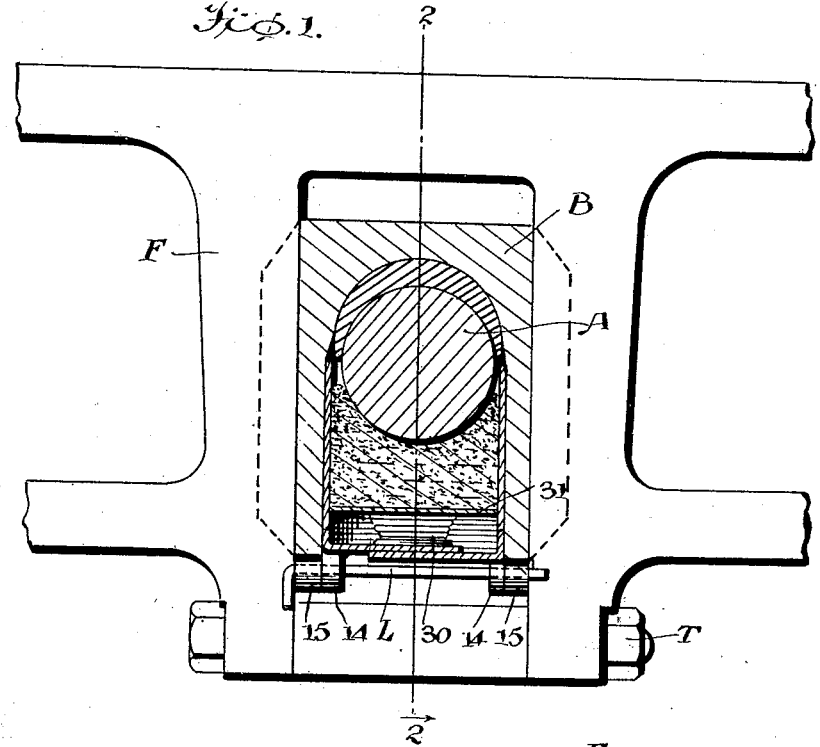
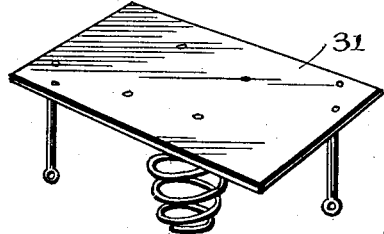
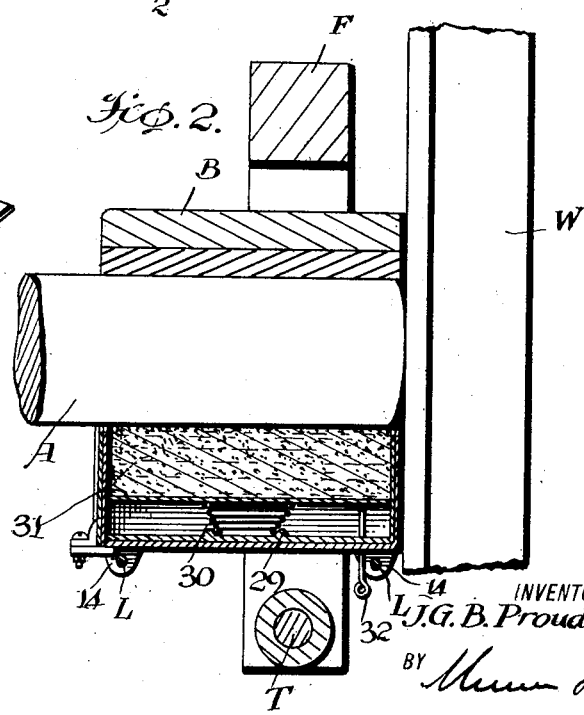
INVENTOR
J. G. B. Proudfoot,
BY
ATTORNEYS J. G. B. PROUDFOOT.
LOCOMOTIVE JOURNAL LUBRICATOR.
APPLICATION FILED JAN. 26, 1921.
1,400,237.
Patented Dec. 13, 1921.
3 SHEETS—SHEET 2.
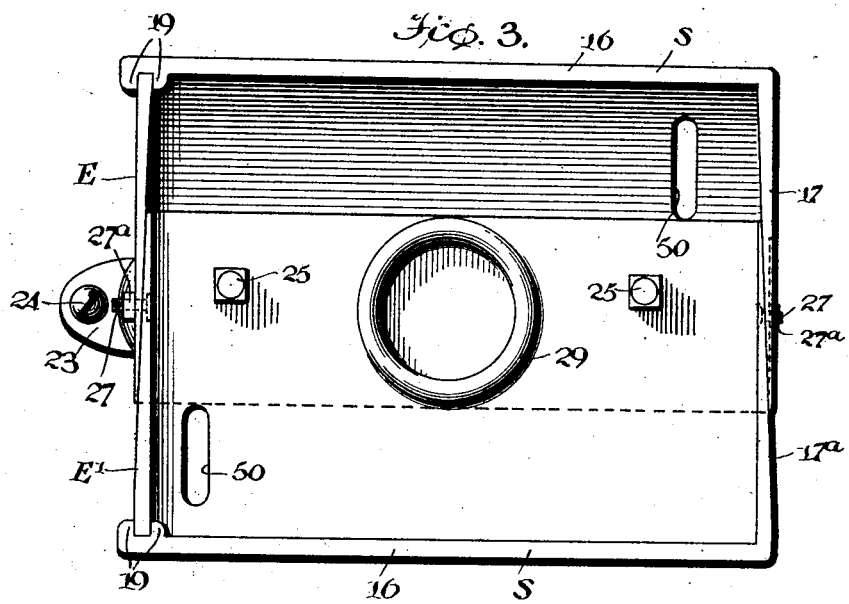
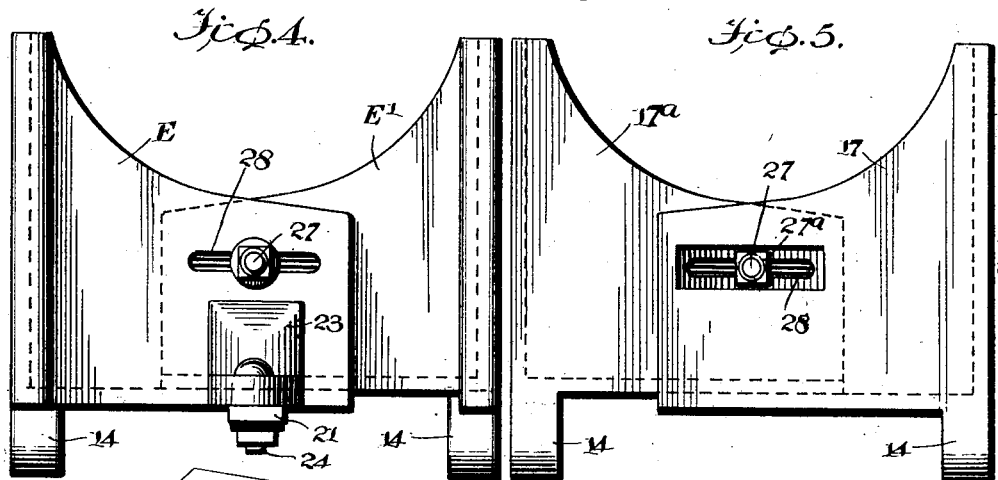
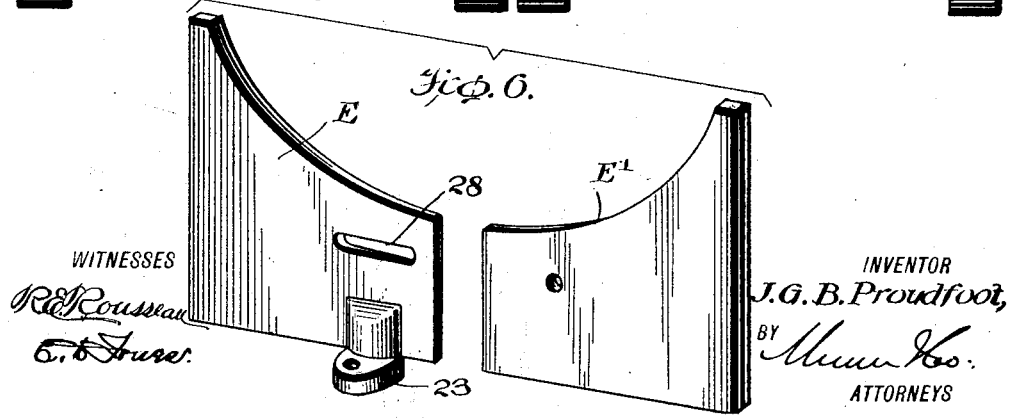

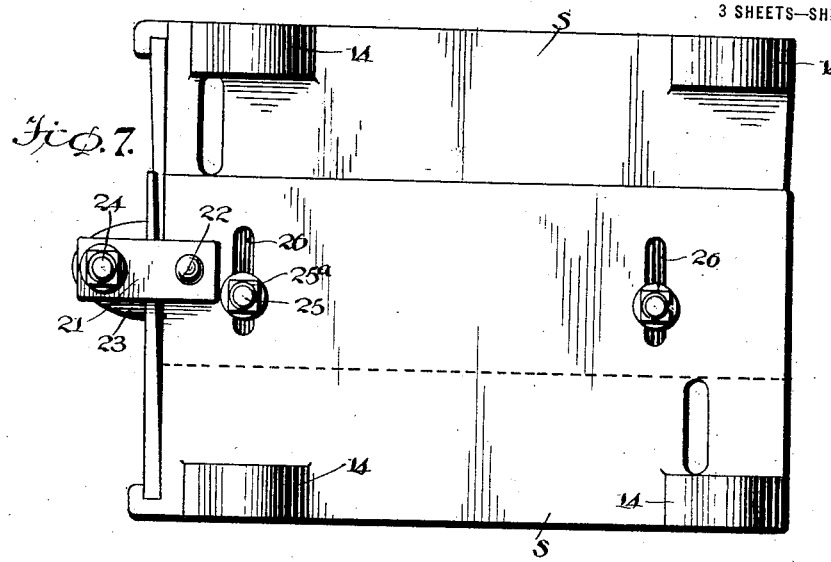
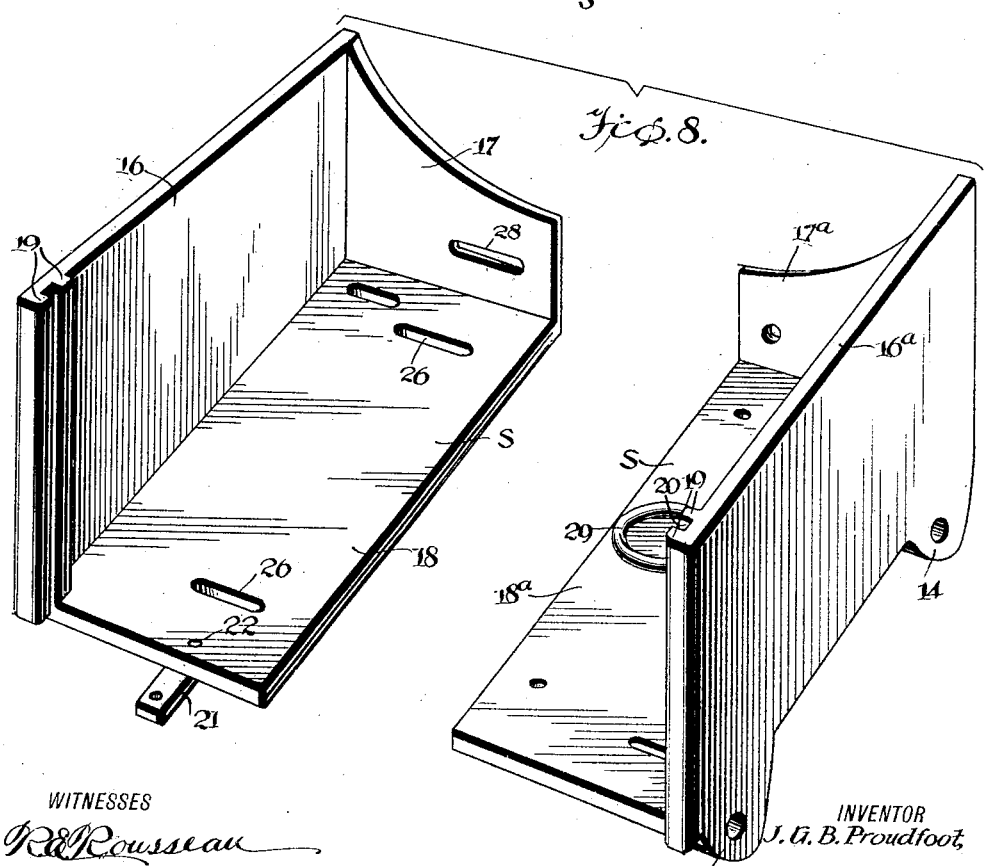

UNITED STATES PATENT OFFICE.

JAMES G. B. PROUDFOOT, OF GRAFTON, WEST VIRGINIA.

LOCOMOTIVE-JOURNAL LUBRICATOR.

1,400,237. Specification of Letters Patent. Patented Dec. 13, 1921.

Application filed January 26, 1921. Serial No. 440,069.

*To all whom it may concern:*

Be it known that I, JAMES G. B. PROUDFOOT, a citizen of the United States, and a resident of Grafton, in the county of Taylor and State of West Virginia, have invented certain new and useful Improvements in Locomotive-Journal Lubricators, of which the following is a specification.

My invention relates to lubricators for the journals of large driving and truck axles of locomotives and the like, and a purpose of my invention is the provision of a lubricator which is adjustable to permit of its adaptation to journals and axles of various sizes, and which is so constructed as to render it easy of access for inspection or renewal and replenishment. Furthermore, my invention provides a lubricator that may be readily replaced in or removed from a locomotive journal box, and which insures of the uniform and reliable lubrication of the journal to prevent its becoming heated.

I will describe one form of journal box and one form of lubricator embodying my invention and will then point out the novel features thereof in claims.

In the accompanying drawings:

Figure 1 is a view showing in vertical section a journal box equipped with one form of lubricator embodying my invention.

Fig. 2 is a vertical sectional view taken on the line 2—2 of Fig. 1.

Fig. 3 is an enlarged detail view showing in top plan the lubricator removed from the journal box.

Figs. 4 and 5 are views showing the inner and outer ends, respectively, of the lubricator shown in the preceding views.

Fig. 6 is a view showing in perspective the end sections of the lubricator removed from the side section.

Fig. 7 is a bottom plan view of the lubricator.

Fig. 8 is a view showing in perspective the side sections detached from each other and from the end sections.

Fig. 9 is a detail perspective view of the follower shown in Figs. 1 and 2.

Similar reference characters refer to similar parts in each of the several views.

Referring specifically to the drawings and particularly to Figs. 1 and 2, F designates the frame or yoke of the locomotive in which is supported a journal box B that is open at the bottom to receive the lubricator, forming the subject matter of my invention. The journal box B is of the usual construction with the exception that its lower edges are provided with ears 15 which are adapted to coact with other ears carried by the lubricator for supporting the latter in proper position within the box. As is usual in locomotive frames of this type, a bolt T is provided for holding the frame in clamping relation with respect to the journal box B. Extending through the journal box is an axle A carrying at its outer end the wheel W.

As shown in Figs. 3 to 8 inclusive, the lubricator in its present embodiment consists of side sections designated generally at S and S' which are telescopically or extensibly associated with each other, and removably associated with these side sections are inner end sections E and E'. As illustrated to advantage in Fig. 8, the side sections S and S' each comprise a side panel 16 or 16$^a$, an end panel 17 or 17$^a$ and a bottom panel 18 or 18$^a$. The side panels 16 and 16$^a$ are formed on their confronting sides and adjacent their inner ends with spaced lips or flanges 19 which provide vertically extending grooves 20 or 20$^a$ which are open at their upper and lower ends to slidably receive the end sections E and E' in the manner shown in Figs. 3 and 7. The end sections are secured against vertical displacement by means of a locking finger 21 which is pivotally supported at one of its ends upon the bottom panel 18 by means of a rivet or pin 22. The locking finger 21 is adapted to be secured in spanning relation to the lower edge of the side section E by means of a lip or lug 23 formed integral with the section E, this lug and the finger being formed with openings to receive a bolt 24 for securing the finger to the lug and in spanning relation with respect to the section E. The section E is adapted to be secured to the section E' so that with the first section supported against downward movement, it will be clear that both sections E and E' are maintained in proper position with respect to the side sections.

In the assembled position of the side sections S and S' as shown in Figs. 3, 4 and 5, the bottom panels 18 and 18$^a$, as well as the end panels 17 and 17$^a$, are arranged in overlapped relation with respect to each other so as to permit of the extension and contraction of the side sections. The side sections may be locked in any adjusted position by means of bolts 25 mounted in the panel 18ª and extending through slots 26 formed in the bottom panel 18, and bolts 27 extending through slots 28 formed in the end panel 17 and the end section E. These bolts 25 and 27 are provided with nuts 25ª and 27ª which are arranged to embrace the panels and to thus secure the side and end sections in adjusted position, it being understood that the slots 26 and 28 permit of the required range of adjustment while still maintaining the sections in lubricator formation.

In order to prevent the bolt extending through the end panels 17 and 17ª projecting into the path of movement of the wheel W, that portion of the panel 17 adjacent the slot is recessed so that the nut on the bolt occupies a counter-sunk position with respect to the panel, as clearly shown in Fig. 5.

As shown in Figs. 4 and 5, the end panels 17 and 17ª and the end sections E and E' have their upper edges of concave contour so as to conform to the curvature of the locomotive axle when in applied position. As shown in Fig. 3, the confronting ends of the panels and sections are tapered in width so that the overlapping portions thereof will present substantially the same thickness as the outer ends of the panels.

As illustrated to advantage in Fig. 7, the bottom panels on the lower edges of the side panels are formed with depending ears 14 which are adapted to coact with the ears 15 formed on the journal box B in receiving locking rods L (Figs. 1 and 2) for securing the lubricator as a unit in proper position within the journal box. These locking rods are bent at one end and provided with cotter pins at the opposite end for securing them against displacement from the ears.

As shown in Figs. 3 and 8, the bottom panel 18ª is formed intermediate its ends with an annular positioning flange 29 which is designed for the reception and positioning of a coil spring 30. As shown in Figs. 1 and 2, a follower F is embodied in the lubricator for constantly urging the lubricating material in contact with the locomotive axle. As shown in Fig. 9, this follower comprises a rectangular plate 31 to the under side of which is secured the coiled expansible spring 30. Depending from and pivotally secured to the plate 31 are keeper rods or links 32 which have their free ends formed with eyes for the reception of pins (not shown) for holding the follower in inactive position as will be hereinafter described.

In the applied position of the lubricator within the journal box B, the locking rods L through the medium of the ears 14 and 15 serve to retain the lubricator in proper position with respect to the axle A. To insert a lubricant within the lubricator and between the axle A and the plate 31 of the follower F, it is necessary to first remove the end sections E and E'. This can be readily accomplished by moving the locking finger 21 to releasing position upon withdrawal of the bolt 24 from the lug 23. With the bolt 24 removed, the finger can be swung about its pivot 22 beneath the bottom panel 18 so that the end sections E and E' will slide downwardly from the grooves 20 and 20ª. With the end sections removed, access is now had to the interior of the lubricator, and the lubricant can now be inserted by effecting a depression of the bolt 31 against the tension of the spring 30. This is accomplished by means of the links 32, it being understood that the latter extend through suitable slots 50 formed in the bottom panels 18 and 18ª and by pulling downwardly upon the same, and locking them against upward movement, the follower will be depressed and maintained in such depressed position so that the lubricant can be inserted between the axle A and the plate 31. I have shown no means for maintaining the links 32 in depressed position, but it is to be understood that any suitable means may be provided for securing this end such as by placing nuts upon the extended ends of the links and passing pins through the eyes so as to prevent upward movement of the links through the nuts. After the lubricant has been inserted, the end sections E and E' are replaced and locked by restoring the finger 21 to locking position. The links 32 are now released thus permitting the spring 30 to act on the plate 31 causing the follower to constantly urge the lubricant into contact with the axle A. This insures the uniform and reliable lubrication of the journal so as to prevent its becoming heated.

In applying the lubricator to any journal box, it is first necessary to adjust the side sections S and S' and end sections E and E' so as to snugly fit within the opening of the journal box.

From the foregoing description, it will be clear that this adjustment can be readily effected by a loosening of the several bolts 25 and 27 so that the side and end sections can be moved toward or away from each other until the lubricator of the required dimensions is formed. This adjustable feature manifestly permits of the adaptation of the lubricator to journal boxes and axles of various dimensions so that in actual practice a lubricator of standard size can be manufactured to fit any size journal box within a certain range.

Although I have herein shown and described only one form of journal box and one form of lubricator, each embodying my invention, it is to be understood that various changes and modifications may be made herein without departing from the spirit of the invention and the spirit and scope of the appended claims.

What I claim is:

1. A journal lubricator comprising, a frame including side sections and end sections extensibly associated with each other, and the end sections being removably associated with the side sections, and a lubricating device within the frame.

2. In combination, a journal box, a frame including extensible sections, certain of the sections being removably associated with the remaining sections to permit of access to the interior of the frame, and a lubricating device within the frame.

3. In combination, a journal box, and a lubricator within the box, said lubricator comprising a frame including extensible and removable sections, means for supporting the lubricator within the box, and a spring pressed follower within the frame.

4. In combination, a journal box, and a lubricator comprising, a frame including extensible and removable sections, ears carried by certain of the sections and by said box, locking rods extending through said ears for supporting the frame within the box, and a follower within the box adapted to urge the lubricant in the direction of the axle.

5. A lubricator for journal boxes comprising, a frame including extensible sections, certain of the sections being removable from the remaining sections, means for locking the removable sections against displacement, and a spring pressed follower within the frame.

6. A lubricator for journal boxes comprising, a frame including extensible sections, certain of the sections being removable from the remaining sections, means for locking the removable sections against displacement, a spring pressed follower within the frame, and means for maintaining the follower in inactive position.

7. A lubricator for journal boxes comprising, side sections including bottom panels and end panels arranged in overlapped relation with respect to each other, end sections removably associated with the side sections and arranged in overlapped relation with respect to each other, slots formed in the bottom and side panels and in the end sections, bolts extending through said slots, means for preventing displacement of the end sections from the side sections, and a follower within the frame.

8. A lubricator for journal boxes comprising, side sections including bottom panels and end panels arranged in overlapped relation with respect to each other, end sections removably associated with the side sections and arranged in overlapped relation with respect to each other, slots formed in the bottom and side panels and in the end sections, bolts extending through said slots, means for preventing displacement of the end sections from the side sections comprising, a lug secured to one of the side sections, a locking finger pivoted to one of the side panels, and a bolt extending through said lug and finger, and a follower within the frame.

JAMES G. B. PROUDFOOT.